Sept. 6, 1932.   B. A. MORTON   1,876,313
ILLUMINATING APPARATUS
Filed Sept. 7, 1929   4 Sheets-Sheet 1
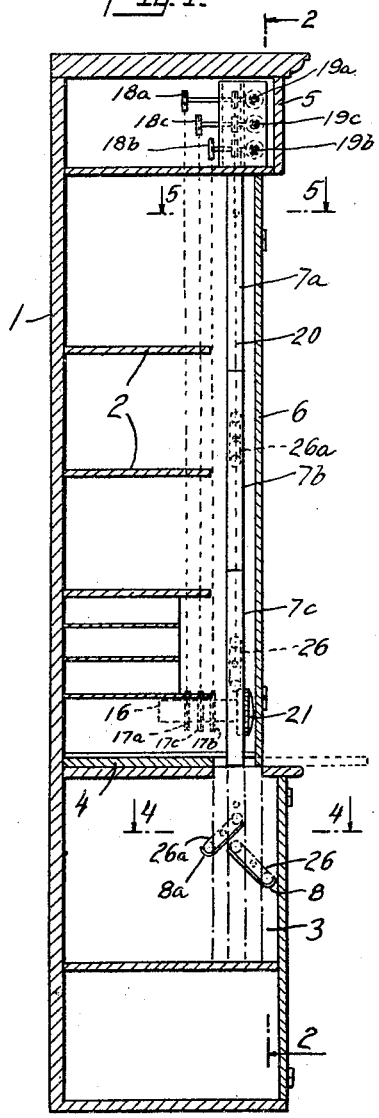
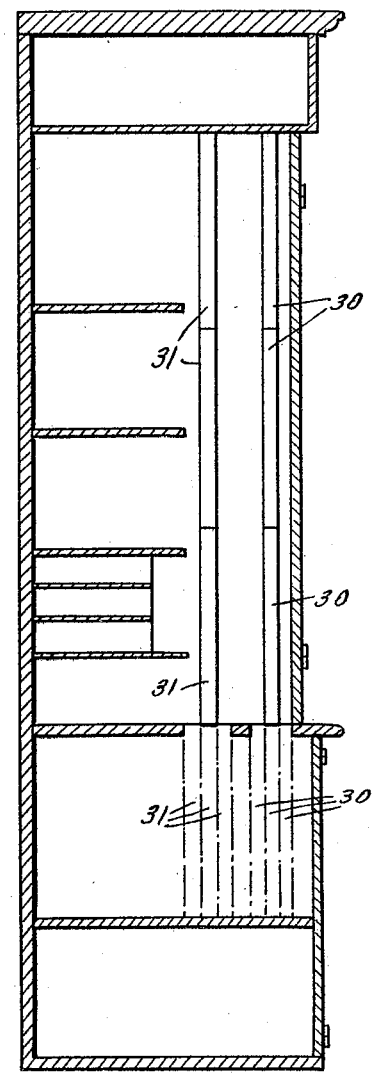
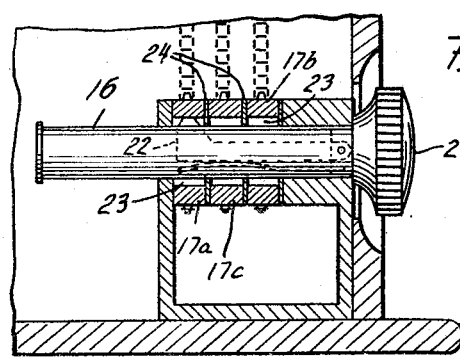
INVENTOR
Benjamin A. Morton
BY
Pennie, Davis, Marvin & Edmonds
his ATTORNEYS INVENTOR
Benjamin A. Morton
BY
Pennie, Davis, Marvin & Edmonds
his ATTORNEYS

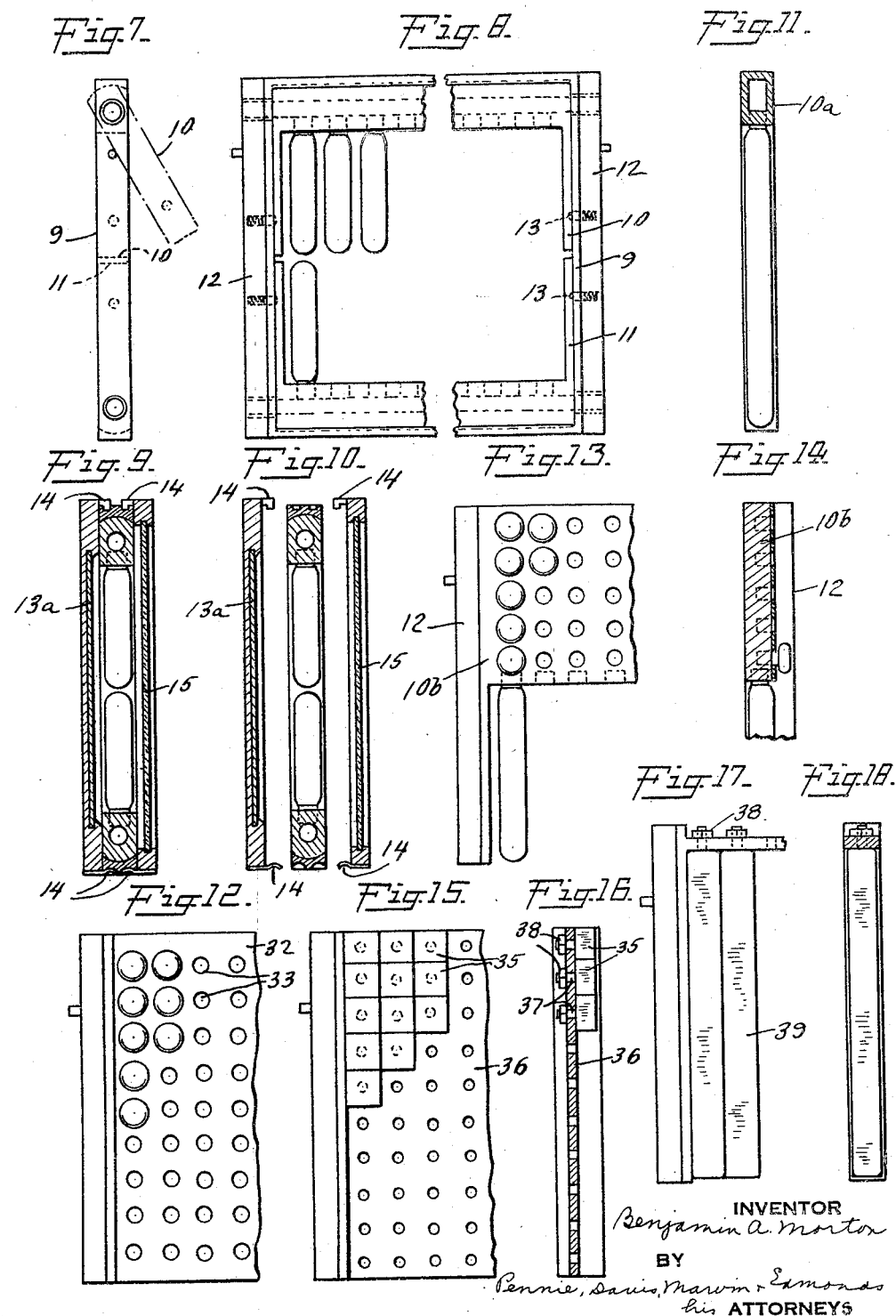

Sept. 6, 1932.  B. A. MORTON  1,876,313
ILLUMINATING APPARATUS
Filed Sept. 7, 1929  4 Sheets-Sheet 4
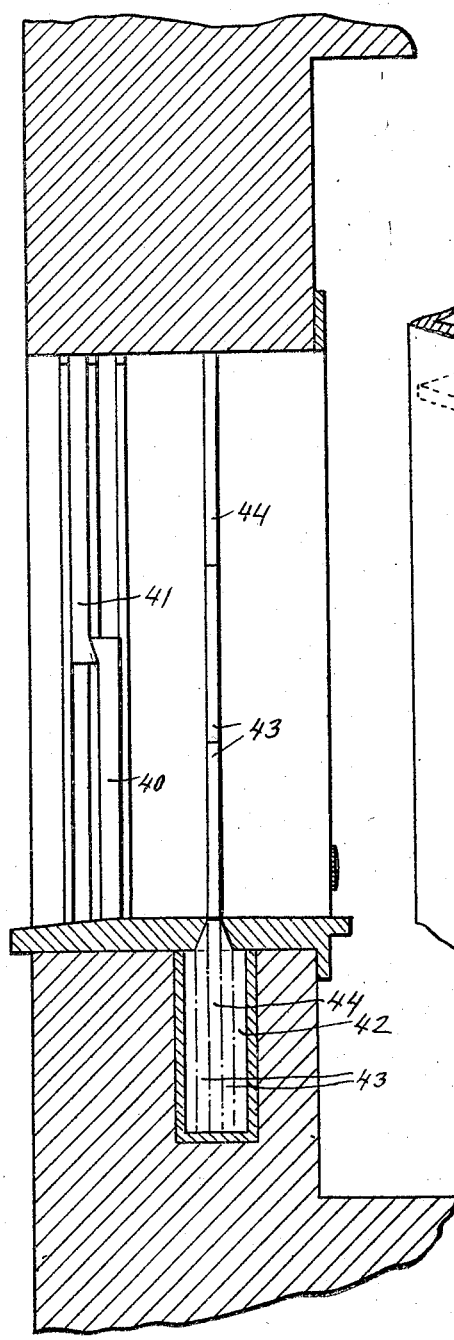
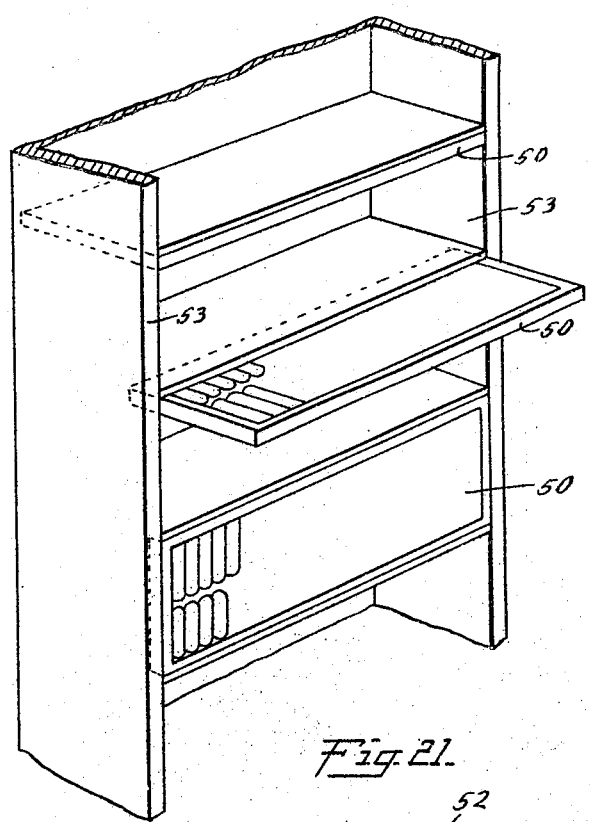
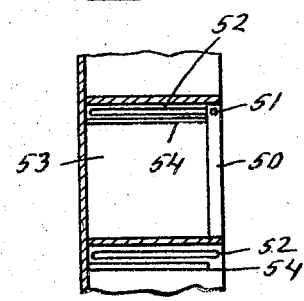

Patented Sept. 6, 1932

1,876,313

UNITED STATES PATENT OFFICE

BENJAMIN A. MORTON, OF NEW YORK, N. Y.

ILLUMINATING APPARATUS

Application filed September 7, 1929. Serial No. 390,916.

This invention relates to improvements in method and apparatus for in-door illumination, and has for its object to combine with a suitable article of furniture or some fixture of the room, as, for instance, a window frame, a movable source of illumination which may be shifted completely out of view when not in use, and when moved into operative position will present a flat illuminated surface forming part of the surface of the article of furniture, window or the like.

A further object of the invention is to provide a method and apparatus of the character described in which standard electric light bulbs may be used as well as the lamp bulbs of polygonal cross section as described in my co-pending application, Ser. No. 299,715, filed August 15, 1929.

A further object of the invention is to provide an apparatus in which several light-carrying members are so arranged that they may be shifted into and out of the same plane so as to increase or decrease the illuminated area, as conditions may warrant.

A further object of the invention is to provide a light-carrying member of the shape of a thin panel containing a reflector, a series of light bulbs and a diffusing surface so arranged as to facilitate the ready removal and replacement of the bulbs therein.

The accompanying drawings illustrate several modifications of my invention, and in said drawings Fig. 1 is a sectional view of a bookcase or secretary equipped with my improved lighting arrangement;

Figs. 3, 4 and 5 are detail views on an enlarged scale of portions of the mechanism for shifting the panels containing the lights;

Fig. 6 is a view similar to Fig. 1 showing a modified arrangement of the light units;

Figs. 7 and 8 are detail views of one form of lighting panel;

Figs. 9 and 10 are detail views of the lighting panel shown in Figs. 7 and 8 equipped with light-diffusing and reflecting members;

Figs. 11 and 12 are detail views of modified forms of panel;

Figs. 13 and 14 are detail views of a further modification of the lighting panel;

Figs. 15 and 16 are similar detail views showing a panel employing the special form of light bulb shown in my co-pending application above referred to;

Figs. 17 and 18 are detail views showing a panel employing another spherical form of bulb;

Fig. 19 is a vertical sectional view showing the application of my improved lighting system to a window;

Fig. 20 is a perspective view showing a modified form of bookcase equipped with my improved lighting panels; and Fig. 21 is a sectional detail of the same.

Figure 2:
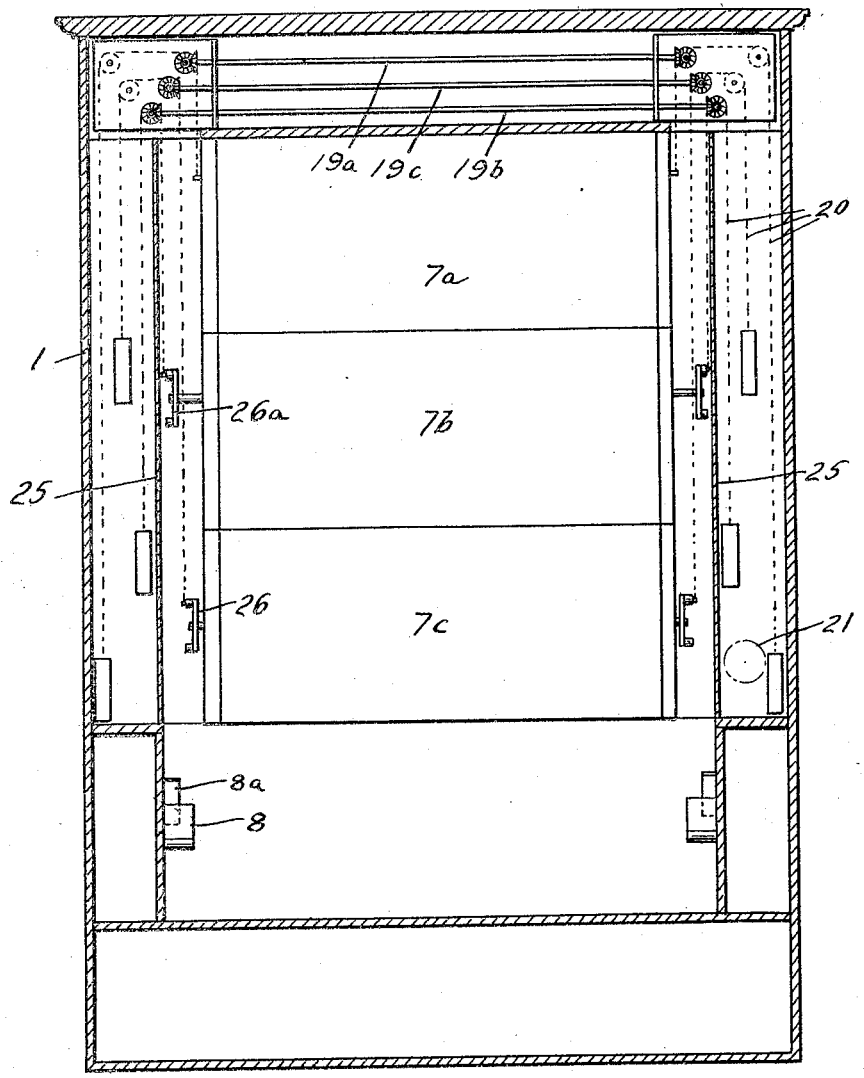
Fig. 2 is a transverse section on line 2—2 of Fig. 1.
Figure 4:
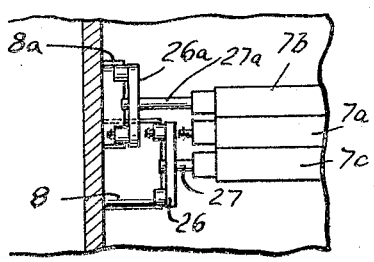
Figure 5:
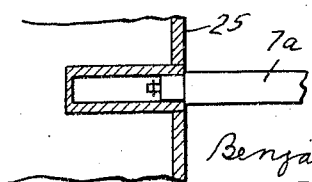

Referring to the drawings, particularly to Figs. 1–5 inclusive, 1 indicates a bookcase of ordinary design comprising book shelves 2 in the upper part of the case and a cupboard 3 at the bottom of the case, with a writing shelf 4 resting on the top of the cupboard, to be drawn out to extended position, as indicated in dotted lines, to serve as a writing desk. The bookcase is provided with a top piece 5 projecting beyond the shelves and with doors 6 which can be closed beneath the top piece in the manner shown. The doors 6 do not close back against the edges of the shelves, as in the usual bookcase construction, but are spaced somewhat from the edges of the shelves to provide space for the light-carrying panels 7a, 7b, 7c, which may be adjusted into and out of position in front of the shelves. When not in position for illumination, the panels, here shown as three in number, drop below the writing shelf 4 into the cupboard section 3, where they are held in position by guides 8, 8a, the construction of which will be later described.

The preferred construction of the panel sections is shown in Figs. 7–10 inclusive. Each section comprises a hollow rectangular frame 9 which encloses two U-shaped frames 10 and 11, respectively, the upper section 10 being inverted so that the two together form a rectangular frame lying within the rectangular frame 9. The U-shaped frame 10 is pivoted at the top to the adjacent sides of the frame 9 so as to swing outwardly at the bottom, while the frame 11 is similarly pivoted at the bottom to swing outwardly at the top. Each of the frames is provided across the inner face of its horizontal member with a series of light sockets for receiving elongated light bulbs of the type commonly known as show-case lights. These bulbs are about one-half or three-quarters of an inch in diameter, and four or five inches in length, and the sockets are spaced close together, as shown. The vertical dimension of the two frames is such that the ends of the bulbs lie close together so that when all the bulbs are lighted the entire area of the panel will be illuminated.

By swinging the U-shaped frames in the manner described, the removal and replacement of the bulbs is facilitated, as will be obvious. The rectangular frame 9 is provided along the sides with guide bars 12, and the U-shaped frames are held in position against accidental displacement by means of spring plugs 13 working in holes in the frame 9 and bars 12, respectively.

To further diffuse the light from the bulbs the panel is preferably provided on its rear face with a reflector 13a detachably secured to the panel in any suitable manner, for example, by means of the catches 14, as shown in Figs. 10 and 11. The front of the panel is also preferably provided with a similar cover containing a ground glass or other light-diffusing member 15, the reflector and the diffusing glass serving to completely diffuse the lights from the bulb filaments so that the filaments themselves are not individually visible.

Any suitable mechanism may be employed for adjusting the panels into and out of view. I have shown for the purpose a hand-operated mechanism comprising a hollow shaft 16 carrying three separate sprockets 17a, 17b, 17c, respectively, which sprockets are connected to sprockets 18a, 18b, 18c on transverse shafts supported in the top member of the bookcase at one side of the position occupied by the shelves. The shafts 18a, 18b, 18c carry beveled gears which mesh with similar gears on the transverse shafts 19a, 19b, 19c. Each of the shafts carrying the sprockets 18a, 18b, 18c is provided with a guide pulley for the counterweight chains 20 of the corresponding lighting panel. A similar arrangement of sprocket wheels is provided on the shafts of the beveled gears at the other side of the bookcase whereby upon rotation of any one of the sprockets 17a, 17b, 17c the corresponding light panel will be raised or lowered at both ends in unison.

In order to rotate the sprockets 17a, 17b, 17c as desired, there is provided a knob 21 attached to the end of the shaft 16 by means of which the shaft may be moved longitudinally or rotated as desired. The shaft 16 carries a spring-pressed key 22 whose point is adapted to engage between teeth 23 formed on the inner periphery of the several sprocket wheels. The several sprockets are held against rotation between the bearings for the shaft 16 and are separated one from the other by means of washers 24 so that as the shaft is shifted longitudinally in its bearings the key will be pressed inwardly by the washer in passing from one sprocket to another and will then be forced outwardly into engagement with the adjacent sprocket. The several light panels 7a, 7b, 7c are guided for vertical movement in grooves in the inner side walls 25 of the bookcase, which are spaced from outer side walls sufficiently to provide a space for the counterweights.

The sprocket chains 20 carrying the counterweights for the lower light panel 7c are attached thereto by pivoted members 26 whose purpose is to cause the panel to be shifted laterally when it reaches its lower position in the cupboard section out of the way of the middle panel, so that the middle panel and the upper panel also may all be moved into the cupboard section. This pivoted member 26 consists of a short bar with guide rollers at each end, the bar being pivoted at its middle point to the sash section by means of pins 27 which extend outwardly some distance from the edge of the panel.

The guides 8 which serve to support the panel section in its place in the cupboard consist of inclined bars fixedly supported in the side walls of the cupboard and positioned to underlie the pivoted members 26. The counterweight chain is attached to the upper end of the pivoted bar 26 so that as the light panel descends into the cupboard section the guide roller at the lower end of the pivoted bar will engage the guide 8 and cause the light panel to be shifted toward the front out of alignment with the guide grooves in the side walls of the bookcase section. Similarly, the guides 8a serve to engage the pivoted members 26a attached to the side edges of the middle light panel. The pins 27a on which these pivoted members are mounted are longer than the pins 27 and the guides 8a project a lesser distance from the supporting wall of the cupboard section than guides 8. By this arrangement the bars 26 on the lower light panel will clear the guides 8a, but will be engaged by the guides 8 to thereby shift the lowermost panel toward the front, while the bars 26a on the middle panel will engage the guides 8a and shift the panel to the rear.

The counterweight chains for the top panel may be connected directly to the panel as this panel need not be shifted laterally when it is lowered into the cupboard section.

The operation of the apparatus will be clearly understood from the foregoing description. When the lights are not being used the bookcase presents an appearance no different from an ordinary bookcase provided with a writing shelf and lower cupboard section. Nor is its usefulness in any way impared except that the light panels must be raised to give access to the upper shelf of the cupboard compartment. When the lights are to be used the glass doors may be left open or closed, as desired, and one or more panels may be brought into use and adjusted to any desired position.

Instead of having a reflecting surface supported on the same frame with the light bulbs, the reflectors may be carried by frames separately adjustable into and out of the lower compartment of the bookcase. Such arrangement is shown in Fig. 6, wherein the panels 30 represent the light-carrying units and the panels 31 the series of reflectors. The operating mechanism of the panels is not illustrated in this figure, as it will be understood that the mechanism shown in Fig. 1 is merely duplicated for the two rows of panels.

It may also be desired to have the ground glass diffusing surfaces separate from the light panels, in which case the panels 30 will contain ground or prismatic glass panes, and panels 31 will contain the lights. With this arrangement the doors of the bookcase section may be omitted, the glass panels serving the purpose of the closure for the bookcase.

The double row of bulbs shown in Figs. 7–10 may if desired be replaced with a single row of longer bulbs such as shown in Fig. 11. With these bulbs a single U-shaped frame 10a is employed. This frame may be pivoted in the outer square frame 9 in the same manner as the upper frame 10 of the preferred construction, or the frame 9 may be omitted and the frame 10a fixedly attached to the side members 12.

Instead of using the showcase bulbs such as illustrated in Fig. 7 et seq., bulbs of other shapes may be employed. For instance, as shown in Fig. 12, the panel for supporting the bulbs consists of a plate or board 32 containing a series of lamp sockets 33 set in the board in a position for the bulbs to be screwed into the face of the board. That is the axis of the screw sockets is perpendicular to the plane of the board.

Also, of course, the panels may be made up in part of showcase bulbs and in part of ordinary bulbs, as shown in Figs. 13 and 14. In this construction the bulb carrying frame 10b is U-shaped and the cross member of the frame is widened out to provide a flat surface in which the sockets 32 for the round bulbs are set. The sockets for the showcase bulbs are set in the lower edge of the frame 10b.

My improved bulb of polygonal cross section illustrated in my copending application Ser. No. 299,715, is particularly adapted for use in connection with the invention of the present application. As shown in Figs. 15 and 16, the light bulbs 35, here shown as of square cross section, are supported in a plate 36 in spaced perforations to receive the stems 37 of the light bulbs. The face of the plate is silvered, or plated, or otherwise treated, to provide a reflecting surface, and as the faces of the bulbs, which may be frosted, occupy the entire surface of the panel, no diffusing glass is necessary. The bulbs are held in place in the reflector plate by nuts 38 threaded on the stem and which clamp the bulbs against the plate.

In Figs. 17 and 18 I have illustrated a modified construction in which long bulbs 39 of a rectangular cross section are employed. These bulbs may be fastened in place by means of nuts 38 such as employed with the bulbs 35.

The electrical connections for the bulbs have not been shown, as such connections form no part of my present invention. Any approved arrangement may be employed. If the panels are formed of molded material such, for example, as bakelite, the connections to the several sockets may be very readily molded in the panel. Also, of course, the several panels may be connected by flexible conductors with some stationary part of the bookcase, or wiping contacts may be provided on the edges of the panels.

My improved arrangement of lighting panels is not limited in its application to bookcases and like articles of furniture. It may, for example, be readily combined with an ordinary window, as illustrated in Fig. 19. As here shown, the window sashes are illustrated at 40 and 41 and may be ordinary sliding sashes, or casements, or any other desired construction. In front of the window and supported for adjustment into and out of a recess 42 beneath the window sill are a plurality of light-carrying panels 43, 44. The mechanism disclosed in Fig. 1 et seq. may be employed with advantage for adjusting the light panels. Preferably the top panel 44 will be somewhat greater height than the other two panels so that when the three panels are dropped into the recess the top edge of panel 44 will be flush with the window sill and will fill the groove through which the panels are dropped. Also, of course, the frames carrying the light panels may be pivoted in the side members in the manner shown in Fig. 7, so that the panels may be adjusted outwardly to throw the light upwardly against the ceiling for indirect lighting or, if pivoted at the bottom, the panels may be adjusted outwardly at the top to throw the light down for reading, etc.

By combining the light panels with the window in the manner described, the panels serve as an effective shutter at night when the lights are used, and have the additional advantage of having the light coming from the same direction at night as in the day time, whereby an arrangement of the furniture which is best suited for use by daylight is equally suited for use at night. Also, by leaving the window partially open the heat generated by the lights is to a large extent carried away by the resulting convection currents. The light panels may also be made to serve as a ventilator for the room by the simple expedient of leaving an opening at the bottom of the light panels and at the top of the window.

In Figs. 20 and 21 I have illustrated my novel light panels combined with a bookcase of the type having individual doors for the separate shelves. As here shown the door 50 of each shelf consists of a single panel of the character shown in Fig. 7, though of course any other types of panel may be used. The panels are provided at the top with pins 51 working in grooves 52 in the end pieces 53 of the bookcase close to the top of each book compartment, and cleats 54 are provided immediately below the grooves. The cleats are somewhat shorter than the depth of the book compartments so that when the panels are drawn outward to the extent permitted by the grooves the doors will swing down over the books.

If desired the panels may be provided with lights in the bottom half only, the upper half being of clear glass so that the titles of the books will be visible when the doors are closed.

My improved light panel may obviously be used in various ways besides those illustrated. It will be understood that the invention is not limited to any of the details disclosed except insofar as recited in the appended claims.

I claim:

1. The combination of a vertical panel, a light carried thereby, a vertical support for said panel having means for partly concealing it, a member exterior to and separate from said panel for the application of power, and means connecting said member to said panel for adjusting said panel from its concealed position to an exposed position.

2. The combination of a plurality of panels, lights carried thereby, a support for said panels having means for partly concealing them, and a single instrumentality operable to selectively adjust any one of said panels from its position of concealment to a position of exposure.

3. The combination of panels, lights carried thereby, supports for said panels having means for partly concealing them, and means for adjusting said panels from their position of concealment to their position of exposure with their illuminated surfaces one over the other in the same vertical plane.

4. The combination of a plurality of vertically translatable panels, lights carried thereby, a support for said panels, a recess in said support for receiving said panels in side by side parallel vertical arrangement, and means for adjusting said panels out of said recess into exposed positions.

5. The combination of panels, lights carried thereby, supports for said panels having means for partly concealing them, means for adjusting said panels from their position of concealment to their position of exposure, and a common operating mechanism for translating all said panels into a common vertical plane.

6. The combination of a plurality of panels, lights carried thereby, a support for said panels, a recess in said support for receiving said panels in side by side arrangement, and means for vertically and bodily adjusting said panels individually and successively out of said recess into exposed positions one over the other.

7. The combination of panels, lights carried thereby, supports for said panels having means for partly concealing them, means for adjusting said panels from their position of concealment to their position of exposure, and a common operating mechanism for all said panels, said mechanism being adapted by its continued operation to adjust one or more of said panels into exposed position.

8. The combination with a frame of panel-like configuration, a second frame embraced by said first frame and pivoted thereto for adjustment from the plane of said frame to a position at an angle thereto, and a plurality of electric lights carried by the second frame and positioned to provide an illuminated area parallel with the plane of said frame.

9. In combination, a flat-face, hollow, rectangular frame having open front and back faces, and a plurality of illuminating elements mounted therein, said elements occupying substantially all of the opening in the framework, and the faces of said elements lying flush with the faces of said frame and closing the opening therein to thereby constitute the said opening a substantially continuous-band source of light.

10. The combination with an open-framework panel, of two separate smaller-frame halves within said panel, and a plurality of light-sources mounted in each frame-half to form a substantially continuous sheet of illumination congruent with the major dimensions of said panel.

In testimony whereof I affix my signature.

BENJAMIN A. MORTON.